(12) United States Patent
He et al.

(10) Patent No.: US 10,991,991 B2
(45) Date of Patent: Apr. 27, 2021

(54) TRACTION BATTERY WITH CELL ZONE MONITORING

(71) Applicant: Ford Global Technologies, LLC, Dearborn, MI (US)

(72) Inventors: Chuan He, Northville, MI (US); Szushen Peter Ho, Plymouth, MI (US); Xu Wang, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 294 days.

(21) Appl. No.: 16/040,288

(22) Filed: Jul. 19, 2018

(65) Prior Publication Data

US 2020/0028217 A1    Jan. 23, 2020

(51) Int. Cl.
*H01M 10/44* (2006.01)
*H02J 7/00* (2006.01)

(52) U.S. Cl.
CPC ....... *H01M 10/443* (2013.01); *H01M 10/448* (2013.01); *H02J 7/008* (2013.01); *H02J 7/00036* (2020.01); *H02J 7/0091* (2013.01)

(58) Field of Classification Search
CPC .................................................. H01M 10/443
USPC .................................................... 320/150
See application file for complete search history.

(56) References Cited

U.S. PATENT DOCUMENTS

| | | | |
|---|---|---|---|
| 5,606,242 A | 2/1997 | Hull et al. | |
| 6,380,717 B2 | 4/2002 | Murakami et al. | |
| 2014/0203813 A1* | 7/2014 | Driemeyer-Franco | G01R 31/3842 324/434 |
| 2019/0058336 A1* | 2/2019 | Thompson | H02J 7/0029 |
| 2019/0067954 A1* | 2/2019 | Ohkawa | H02J 7/00 |

* cited by examiner

*Primary Examiner* — Edward Tso
*Assistant Examiner* — Ahmed H Omar
(74) *Attorney, Agent, or Firm* — David B. Kelley; Brooks Kushman P.C.

(57) ABSTRACT

A vehicle includes a traction battery having cells and at least one controller. The controller is programmed to charge and discharge the traction battery according to a net current for the traction battery derived from sets of temperature-based current values, each of the sets corresponding to a different one of the cells, and each of the values for a given one of the sets corresponding to a different zone of the cell.

20 Claims, 5 Drawing Sheets

Fig-6

TRACTION BATTERY WITH CELL ZONE MONITORING

TECHNICAL FIELD

This disclosure relates to traction batteries and more particularly to tractions batteries having cell zone monitoring.

BACKGROUND

Hybrid-electric and pure-electric vehicles include a traction battery for providing power for propulsion. The traction battery typically includes a number of battery cells connected in various configurations. Various properties of the traction battery may be monitored to ensure optimal operation of the vehicle. For example, battery state of charge (SOC), which indicates the amount of charge stored in the battery, may be monitored. The state of charge may be calculated for the traction battery as a whole and for each of the cells. The state of charge of the traction battery provides a useful indication of the charge remaining. The state of charge for each individual cell provides information that is useful for balancing the state of charge between the cells. Balancing of the cells is useful as differences in the state of charge between cells may cause some cells to be overcharged or undercharged relative to the other cells.

SUMMARY

According to one embodiment, a vehicle includes a traction battery having cells and at least one controller. The controller is programmed to charge and discharge the traction battery according to a net current for the traction battery derived from sets of temperature-based current values, each of the sets corresponding to a different one of the cells, and each of the values for a given one of the sets corresponding to a different zone of the cell.

According to another embodiment, a method for controlling an electrified powertrain includes charging and discharging a traction battery according to a net current for the traction battery derived from sets of temperature-based current values. Each of the sets corresponding to a different cell of the traction battery, and each of the values for a given one of the sets corresponding to a different zone of the cell.

According to yet another embodiment, a vehicle includes a traction battery having cells each with first, second, and third zones. At least one controller is programmed to, for each of the cells, output currents for the second and third zones that are based on a voltage of the first zone and temperatures of the second and third zones.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
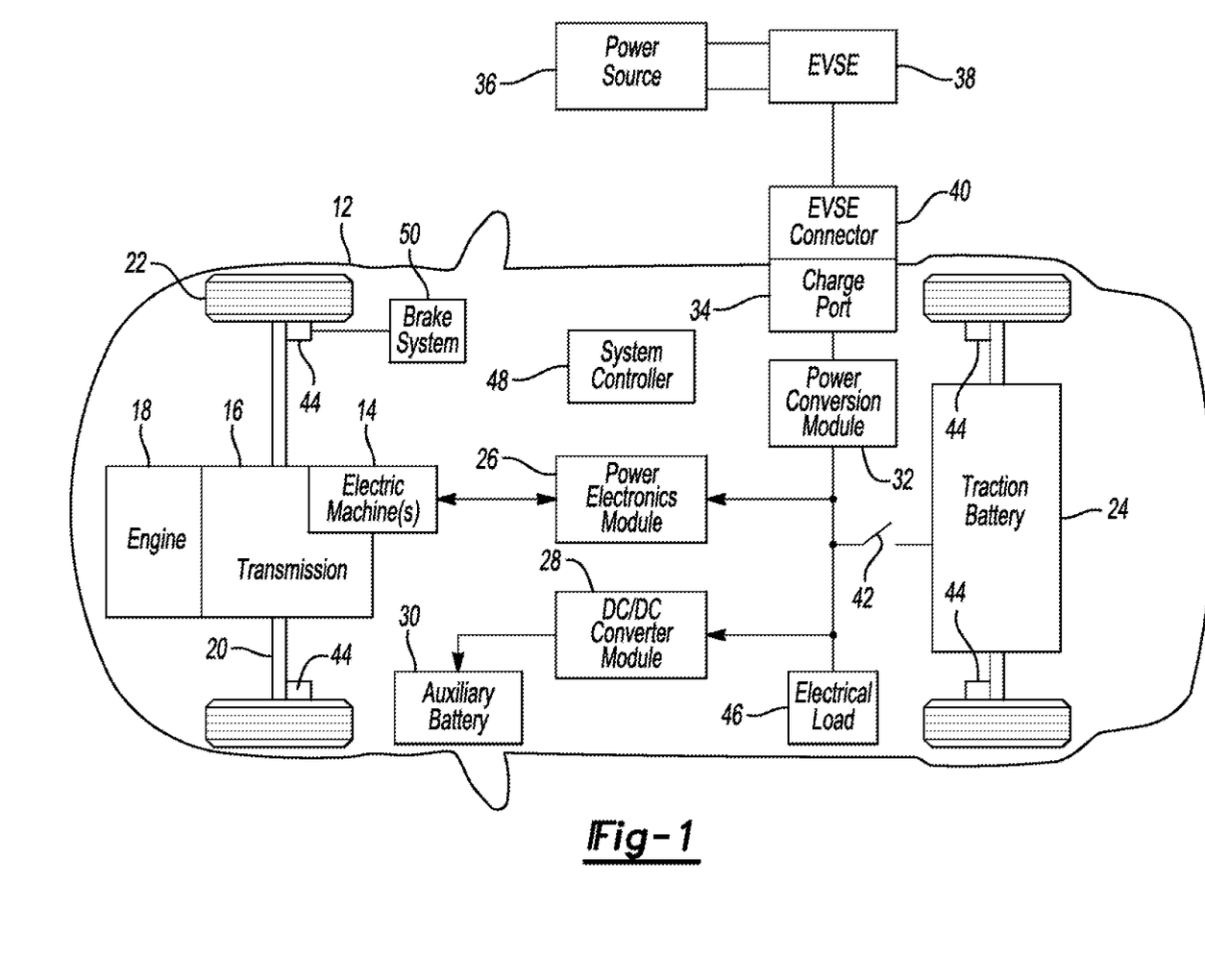
FIG. 1 is a diagram of a hybrid vehicle illustrating typical drivetrain and energy storage components.

FIG. 1 depicts a typical plug-in hybrid-electric vehicle (HEV) 12. The vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient conditions (engine speeds and loads) and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a direct current (DC) voltage while the electric machines 14 may use a three-phase alternating current (AC) to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle may include a DC/DC converter module 28 that converts the high voltage DC output of the traction battery 24 to a low voltage DC supply that is compatible with other vehicle loads. Other high-voltage electrical loads 46, such as compressors and electric heaters, may be connected directly to the high-voltage without the use of a DC/DC converter module 28. The electrical loads 46 may have an associated controller that operates the electrical load 46 when appropriate. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components that work cooperatively to operate the wheel brakes 44. For simplicity, the figure depicts one connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 to decelerate or control the vehicle. The brake system 50 may respond to driver commands and may also operate autonomously to implement features such as stability control. The controller of the brake system 50 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
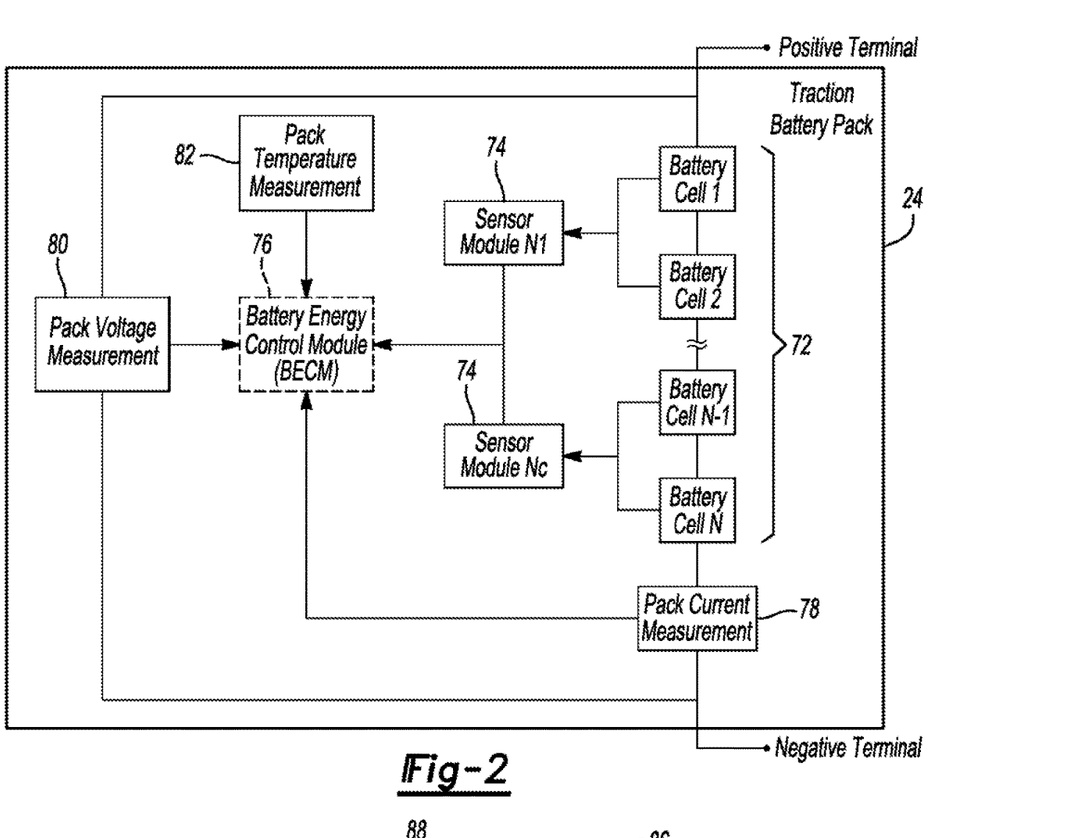
FIG. 2 is a diagram of a possible battery pack arrangement comprised of multiple cells, and monitored and controlled by a Battery Energy Control Module.
Figure 3:
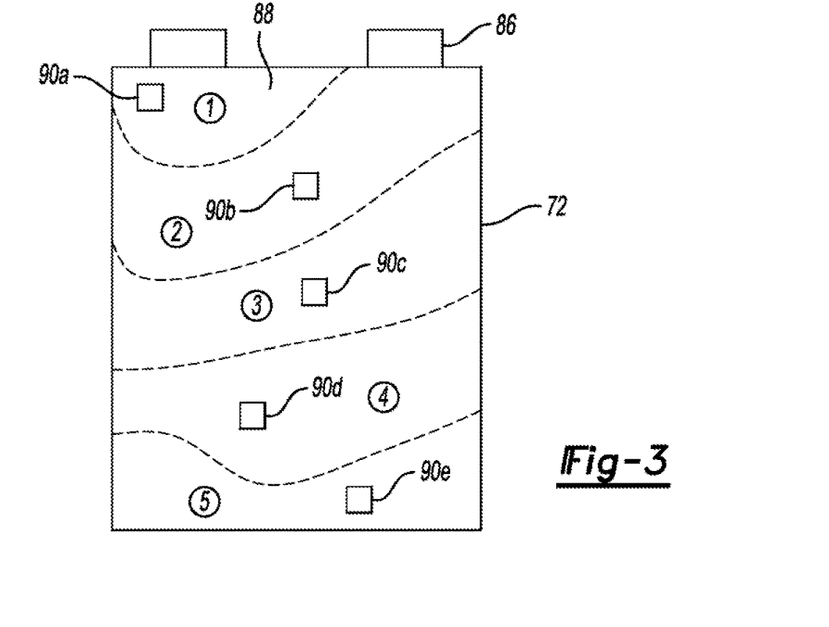
FIG. 3 is front view of a battery cell partitioned into zones.

Referring to FIGS. 2 and 3, the traction battery 24 may be constructed from a variety of chemical formulations such as lead acid, nickel-metal hydride (NIMH) or Lithium-Ion. The traction battery pack 24 may be in a series configuration of N battery cells 72. Other battery packs, however, may be composed of any number of individual battery cells connected in series or parallel or some combination thereof. A typical system may have one or more controllers, such as a Battery Energy Control Module (BECM) 76 that monitors and controls the performance of the traction battery 24. The BECM 76 may monitor several battery pack level characteristics such as pack current 78, pack voltage 80, and pack temperature 82. The BECM 76 may have non-volatile memory so that data may be retained when the BECM 76 is in an OFF condition. Retained data may be available upon the next ignition cycle. A battery management system may be comprised of the components other than the battery cells and may include the BECM 76, measurement sensors (78, 80, 82), and sensor modules 74. The function of the battery management system may be to operate the traction battery in a safe and efficient manner.

In addition to the pack-level characteristics, there may be cell-level characteristics that are measured and monitored for each of the cells 72. These cell-level characteristics include terminal voltage and current, which may be measured with sensors or calculated based on other measurements.

The cell-level characteristics may be measured by a sensor module 74. Depending on the capabilities, the sensor module 74 may measure the characteristics of one or multiple battery cells 72. The battery pack 24 may utilize up to $N_c$ sensor modules 74 to measure the characteristics of each of the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

The cell-level voltages and the pack-level voltage 80 may be measured using a voltage sensor. The voltage-sensor circuit within the sensor module 74 and pack-voltage circuitry 80 may contain various electrical components to scale and sample the voltage signal. The measurement signals may be routed to inputs of an analog-to-digital (A/D) converter within the sensor module 74 and BECM 76 for conversion to a digital value. The sensor module 74, pack-voltage sensor 80 and BECM 76 may contain circuitry to ascertain the status of the voltage-measurement components. In addition, a controller within the sensor module 74 or the BECM 76 may perform signal boundary checks based on expected signal operating levels.

While monitoring cell-level characteristics is an improvement on pack-level monitoring, battery controls can be further improved by dividing each cell into multiple zones and monitoring zone-level characteristics of each zone. The battery cells 72 have a temperature gradient, which causes regions of the cells to be hotter than others. Typically, the cells 72 are hotter near the terminals 86 and colder opposite the terminals, although, the specific temperature gradient will vary based on the specific design of the battery cell. Since, temperature affects electrical resistance, battery life, and performance, the different regions of the cells may have different zone-level characteristics. By monitoring the zone-level characteristics, a more accurate assessment of the battery pack 24 may be determined, which enables more accurate estimation of cell life and battery pack capacity and performance.

In the illustrated embodiment, each of the cells 72 have five zones 88 that are indicated by dashed lines and labeled 1 through 5. Zone 1 is generally the hottest zone, and Zone 5 is generally the coldest. Each of the zones 88 may have an associated temperature sensor 90a-90e, respectively. The temperatures sensors may be in communication with BECM 76 and have a structure similar to that of the above described sensor modules 74. Alternatively, the temperatures and other characteristics of each zone may be calculated, which may be more practical than providing actual sensors for each zone.

Despite each zone 88 also having a gradient, for simplicity, each zone may be assumed to have uniform characteristics, such as resistance, SOC, temperature, current, and open-circuit voltage (OCV), in the below described methods and controls. While the OCV varies from one zone to another, the voltage inside the cell is uniform and can be determined by measuring the terminal voltage with sensor module 74. Because of the battery cell impedance, the terminal voltage may not be the same as the open-circuit voltage. The OCV may not be readily measurable as only the terminal voltage of the battery cell is accessible for measurement. When no current is flowing, for a sufficiently long period of time, the terminal voltage may be the same as the OCV. A sufficiently long period of time may allow the internal dynamics of the battery cells 72 to reach a steady state. When current is flowing the OCV may not be readily measurable and the value may be inferred based on the SOC. For a typical Lithium-Ion battery cell, there is a relationship between SOC and the OCV such that OCV=f (SOC, age). The relationship between SOC and OCV may be determined from an analysis of battery properties or from testing the battery cells. The OCV-SOC curve may be stored in memory as a lookup table. The exact shape of the curve may vary based on the exact formulation of the Lithium-Ion battery. The OCV changes as a result of charging and discharging of the battery.

The below control diagrams illustrate systems and methods for calculating zone-level characteristics of the cells 72.

Figure 4:
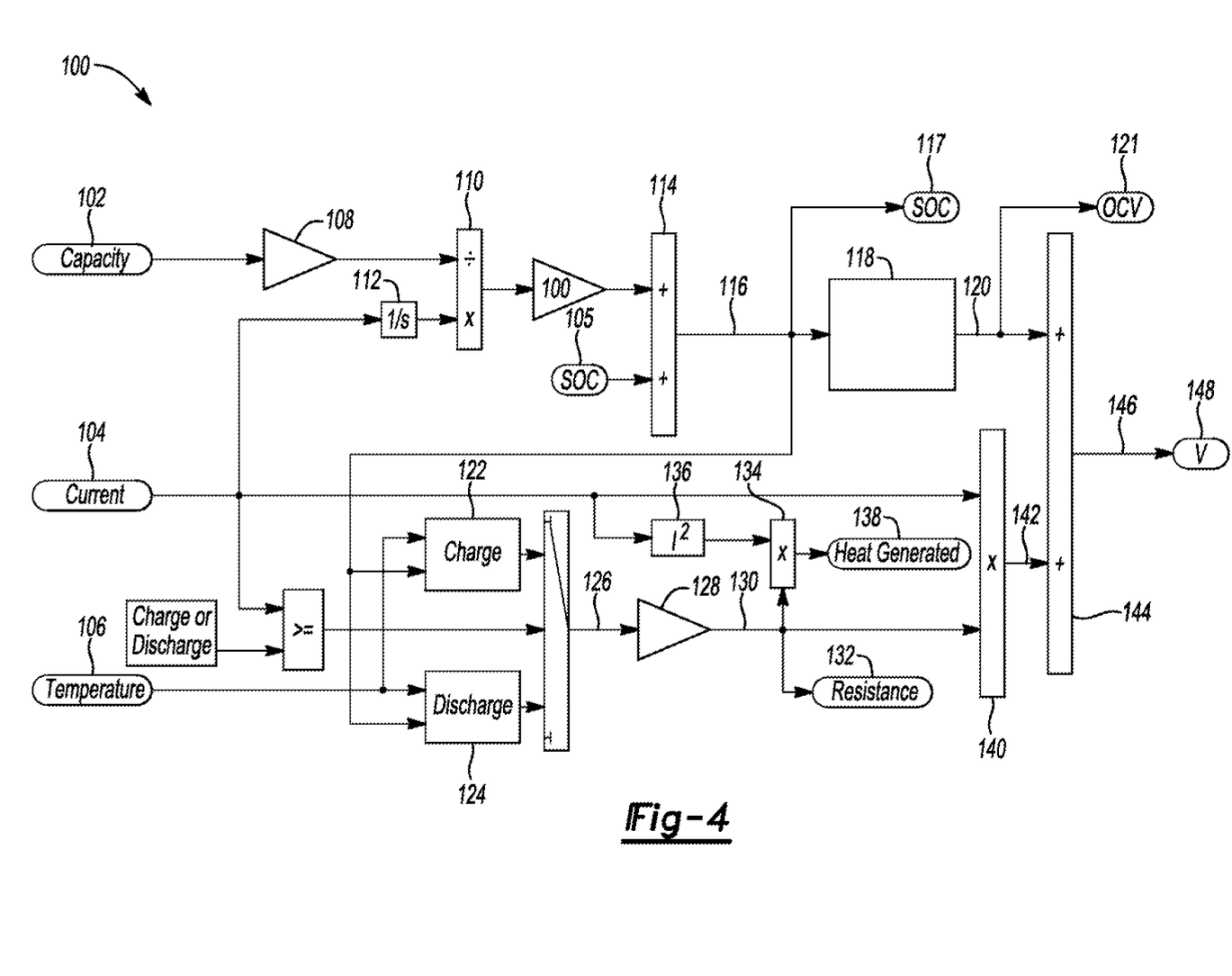
FIG. 4 is a control diagram for calculating at least voltage of a zone of a battery cell.

Referring to FIG. 4, a control diagram 100 for calculating voltage 148, among other things, for one of the zones, e.g., zone 1, is shown. The inputs for control diagram 100 include the capacity 102 of the zone, the current (I) 104 of the zone, the temperature 106 of the zone, and SOC 105 of the zone. The capacity 102 (amp/hours) of the zone is received from the controller 76. At box 108 the capacity is converter into amp/seconds by multiplying by 3600. The current 104 is integrated at box 112 to determine how many amps seconds chargers changed in the cell. The results of boxes 108 and 112 are feed into box 110, where the output of box 108 is divided by box 112 to determine the rate of change of SOC. The output of box 110 is multiplied by 100 to convert it into a percentage and is added or subjected from the initial SOC 105 in box 114 to obtain the current SOC 116. The SOC 116 is held as an output at 117. The SOC 116 is input into box 118, which determines OCV 120 from the above-described lookup table. The OCV is held as an output at 121.

The cell temperature 106 may be a measured valve or a calculated value depending upon the hardware and the logic inside the controller 76. For example, the temperature 106 may be measured by the temperature sensor 90 if the zone 1 is equipped with a sensor. If the zones 88 are not equipped with temperature sensors, then the temperature 106 may be a combination of measured and calculated values depending on operating conditions.

For battery cells that do not include temperature sensors 90, the cells 74 and the zones 88 of each cell will be generally uniform if the battery pack 24 has been inactive for a sufficient amount of time. Thus, in the first iteration or first set of iterations, the temperature 106 may be a measured value that is sensed by a temperature sensor, such as pack temperature sensor 82. In proceeding iterations, where temperature gradients have developed, a calculated value of temperature 106 may be used. (This is described in detail below.)

The temperature 106 is fed into box 122 or 124 depending upon if the battery is charging or discharging. Box 122 is used when the battery is charging and box 124 is used when the battery is discharging. The boxes 122 and 124 contain lookup tables for determining electrical resistance 126. The lookup tables may be stored in memory of the controller 76 or other controller. The lookup tables calculate the resistance for the entire cell based on temperature 106 and SOC 116. The cell resistance value may also be calculated by BECM logic based the ago, cell operation history, and conditions. The resistance 126 is divided by the number of zones, e.g., 5, at box 128 to get the zone resistance 130 if each zone has the same volume. The zone resistance 130 is stored as an output 132 and is fed into box 134.

The current 104 is squared at box 136 and subsequently sent to box 134 where it is multiplied by the resistance 132 to calculate the heat generated 138 in that zone. The heat generated 138 is calculated using equation 1. The heat generated 138 is used in subsequent iterations to calculate the temperature 106.

$$\text{Heat Generated} = I^2 \times R \qquad (\text{eq. 1})$$

The current 104 and the resistance 130 are fed into box 140 and are multiplied by each other to calculate I×R (IR) 142, which is a voltage. At box 144 the voltage 146 is calculated using inputs IR 144 and OCV 120 according to equation 2. the voltage 146 is held as an output at 148. Since the voltage of the cell 74 is uniform, the voltages for the remaining zones, e.g., zone 2-5, are the same as voltage 148 and does not need to be calculated.

$$\text{Voltage}_{calculated} = OCV - IR \qquad (\text{eq. 2})$$

Figure 5:
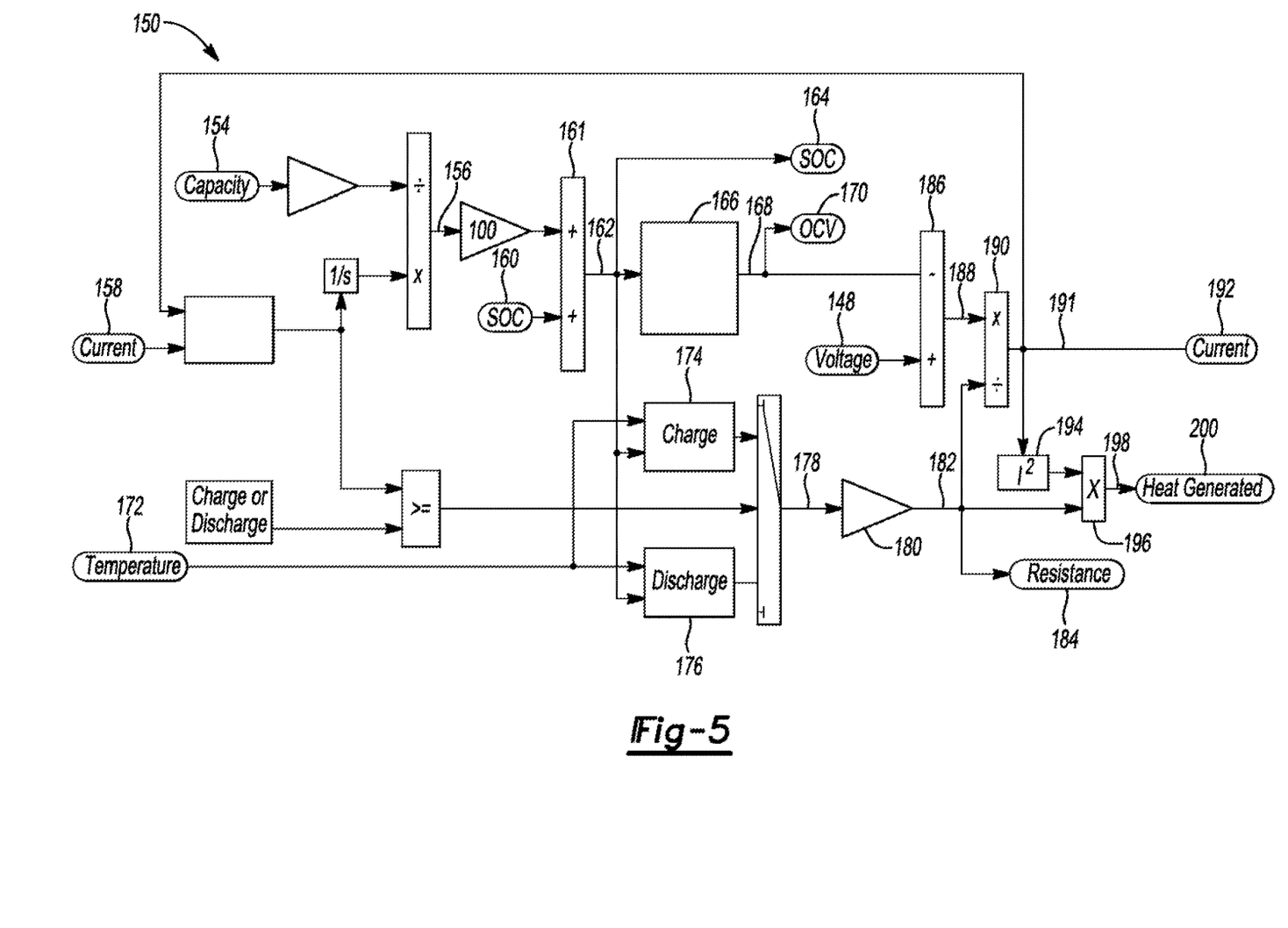
FIG. 5 is a control diagram for calculating at least current of a zone of a battery cell.

Referring to FIG. 5, a control diagram 150 for calculating current 192, among other things, for one or more of the zones, e.g., zone 2, is shown. A capacity 154 of the zone and a current 158 of the zone are used to calculate the rate of change of SOC 156 as described above. The rate of change of SOC 156 is multiplied by 100 to convert it into a percentage and is added or subjected from the initial SOC 160 in box 161 to obtain the current SOC 162. The SOC 162 is held as an output for future iterations at 164. The SOC 162 is input into box 166, which determines OCV 168 from the above-described lookup table. The OCV 168 is held as an output at 170.

The temperature 172 of the zone, which may be measured or calculated, and the current 158 are fed into one of boxes 174 and 176 to calculate the resistance 178. The box 174 may be the same or similar to the box 122, and the box 176 may be the same or similar to box 124. The resistance 178 is divided by the number of zones, e.g., 5, at box 180 to get the zone resistance 182. The zone resistance 182 is stored as an output at 184.

The voltage 148 calculated by control diagram 100 and the OCV 168 are feed into box 186 where the voltage 148 is subtracted from the OCV 168 to calculate the voltage drop 188 caused by cell resistance in box 186 188. The voltage drop 188 is the delta voltage of OCV and cell output voltage (BECM measured voltage). The delta voltage can be calculated using equation 3.

$$\text{OCV} - V_{cell} = \text{Zone Current} \times \text{Cell Resistance} \qquad (\text{eq. 3})$$

The delta voltage 188 and the resistance 182 are fed into box 190, which calculates the current 191. The current 191 is held as an output at 192.

The current 191 is also fed into box 194 where the current is squared. The output of box 194 and the resistance 182 is fed into box 196 to calculate the heat generated 198 of the zone using equation 1. The heat generated 198 is held as an output at 199 and is used to calculate the temperature 172 of the zone in subsequent iterations as described above.

Figure 6:
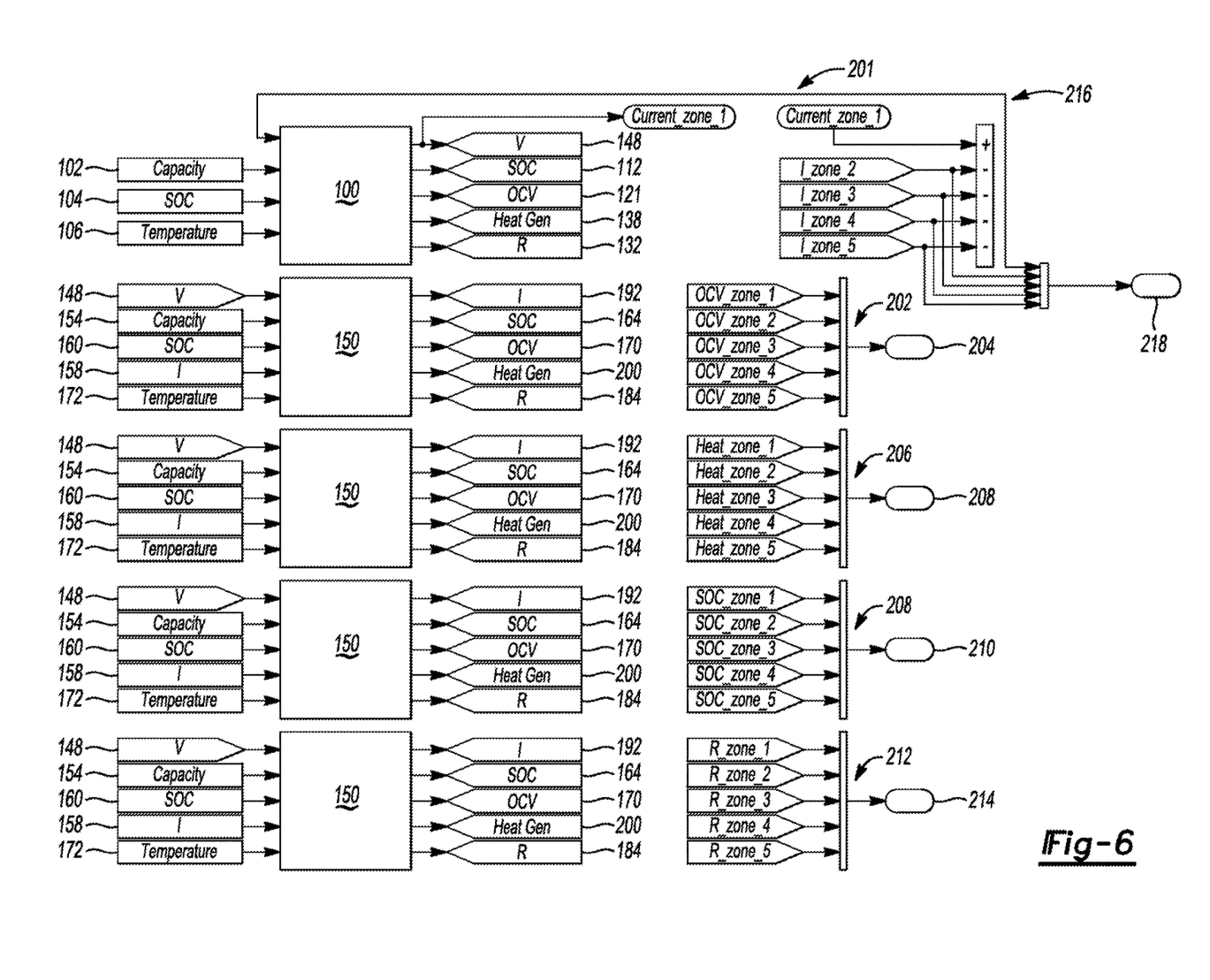
FIG. 6 is a control diagram for calculating whole cell conditions based on the zone conditions calculated with the control diagrams of FIGS. 4 and 5.

Referring to FIG. 6, the above-described control diagrams 100 and 150 may be used to determine characteristics of each zone 88 of the cells 74. For each zone, only one of the controls needs to be performed to determine the characteristics. In the controls 201 of FIG. 6, for example, control diagram 100 may be used for the zone 1 and control diagram 150 may be used for zones 2-5. The controller may determine the characteristics of zone 1 first, and subsequently determine the characteristics of zones 2-5 as the voltage output 148 is used as an input for the calculations of control diagram 150.

As explained above, the capacity 102, the SOC 104, and the temperature 106 are the inputs for the controls 100. Using these inputs and the above described algorithms, the characteristics of zone 1 are determined including voltage 148, SOC 117, OCV 121, heat generated 138, and resistance 132. The characteristics of the remaining zones are then determined using the voltage 148, the capacity 154, the SOC 164, the current 158, and the temperature 172 as inputs. Using these inputs and the above-described algorithms, the characteristics of the remaining zones are determined including current 192, state of charge 164, OCV 170, heat generated 200, and resistance 184.

Once the characteristics of each zone are determined, the controls 201 may determine the characteristics of the whole cell. The zone outputs are combined at 202, 206, 208, and 212 into vectors for the whole cell. For example, the cell resistance may be calculated utilizing equation 4.

$$\frac{1}{\text{Cell Resistance}} = \sum \frac{1}{\text{Zone Resistance}} \qquad (\text{eq. 4})$$

Using zone-level monitoring enables the battery controller to more precisely know the maximum and minimum SOC at each cell zone, which allows the battery controller to more precisely predict how much energy is available in each cell and supplies the heat generation data from each zone for battery cell temperature estimation.

At 216, the current of zone 1 is calculated by the input current minus the zone currents of the other zones of the cell. In this way, the controller can recursively calculate the zone currents based on the known cell voltage 218.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery including cells; and
   at least one controller programmed to charge and discharge the traction battery according to a net current for the traction battery derived from sets of temperature-based current values, each of the sets corresponding to a different one of the cells, and each of the values for a given one of the sets corresponding to a different zone of the cell.

2. The vehicle of claim 1, wherein the net current for the traction battery is further derived from sets of state-of-charge values, each of the sets of state-of-charge values corresponding to a different one of the cells, and each of the values for a given one of the sets of state-of-charge values corresponding to a different one of the zones of the cell.

3. The vehicle of claim 1, wherein at least one of the sets of temperature-based current values is based on a voltage of another one of the zones of the cell.

4. The vehicle of claim 1, wherein the controller is further programmed to charge and discharge the traction battery further according to a net heat-generated value of the traction battery.

5. The vehicle of claim 4, wherein the net heat-generated value is derived from sets of temperature-based heat-generated values, each of the sets of heat-generated values corresponding to a different one of the cells, and each of the heat-generated values for a given one of the sets of heat-generated values corresponding to a different one of the zones.

6. The vehicle of claim 5, wherein each of the heat-generated values is based on electrical resistance and current of an associated one of the zones.

7. The vehicle of claim 1 further comprising a plurality of temperature sensors that are each associated with one of the zones.

8. The vehicle of claim 7, wherein each of the temperature-based current values is based on a reading from an associated one of the temperature sensors.

9. A method for controlling an electrified powertrain comprising:
   charging and discharging a traction battery according to a net current for the traction battery derived from sets of temperature-based current values, each of the sets corresponding to a different cell of the traction battery, and each of the values for a given one of the sets corresponding to a different zone of the cell.

10. The method of claim 9, wherein the net current for the traction battery is further derived from sets of state-of-charge values, each of the sets of state-of-charge values corresponding to a different one of the cells, and each of the values for a given one of the sets of state-of-charge values corresponding to a different one of the zones of the cell.

11. The method of claim 9, wherein at least one of the sets of temperature-based current values is based on a voltage of another one of the zones of the cells.

12. The method of claim 9, wherein the charging and discharging is further according to a net heat-generated value of the traction battery.

13. The method of claim 12, wherein the net heat-generated value is derived from sets of temperature-based heat-generated values, each of the sets of heat-generated values corresponding to a different one of the cells, and each of the heat-generated values for a given one of the sets of heat-generated values corresponding to a different one of the zones.

14. The method of claim 13, wherein each of the heat-generated values is based on electrical resistance and current of an associated one of the zones.

15. A vehicle comprising:
a traction battery including cells each having first, second, and third zones; and
at least one controller programmed to, for each of the cells, output currents for the second and third zones that are based on a voltage of the first zone and temperatures of the second and third zones.

16. The vehicle of claim 15, wherein the controller is further programmed to, for each of the cells, output heat-generated values, for the second and third zones, that are based on the currents and electrical resistances of the second and third zones.

17. The vehicle of claim 15, wherein the controller is further programmed to, for each of the cells, output a current for the first zone based on currents of the second and third zones.

18. The vehicle of claim 17, wherein the controller is further programmed to charge and discharge the traction battery according to a net current of the traction battery that is derived from a sum of currents of the battery cells, wherein each of the currents of the battery cells is a sum of the currents of the zones associated with the cell.

19. The vehicle of claim 15 further comprising a plurality of temperature sensors attached to each of the cells and located within and associated with one of the zones.

20. The vehicle of claim 19, wherein the temperatures of the second and third zones are based on a reading from an associated one of the temperature sensors.

* * * * *